Nov. 29, 1949  G. V. CANDLER, JR  2,489,751
ROOF OR COVERING
Filed July 26, 1945

INVENTOR.
George V. Candler Jr.
BY
Harness, Dickey & Pierce.
ATTORNEYS.

Patented Nov. 29, 1949

2,489,751

UNITED STATES PATENT OFFICE 2,489,751

ROOF OR COVERING

George V. Candler, Jr., Grosse Pointe Farms, Mich.

Application July 26, 1945, Serial No. 607,167

11 Claims. (Cl. 108—1)

The invention relates to new and useful improvements in roof construction.

It is an important object of the present invention to provide a roof of transparent material and to vary or modify its transparency characteristics selectively from clear transparency to absolute opaque to thereby control both the heat and light transfer properties of the material.

Another object of the invention is to provide a roof construction that will absorb and radiate heat energy from the sun in cold weather and reflect heat energy during warm weather.

Still another object of the invention is to provide a roof construction that can be made selectively transparent, translucent or opaque.

Yet another object of the invention is to provide a roof construction that will selectively absorb or transmit certain desired portions of the light spectrum and block or reflect other harmful or undesired portions.

A further object of the invention is to provide a roof construction of the above-mentioned character that can be readily adapted to any desired structure such as a building or automotive vehicle.

A still further object of the invention is to provide a roof of the above-mentioned character that is simple in construction and inexpensive to manufacture.

In the drawing, forming a part of this specification, and wherein like numerals are employed to designate like parts throughout the same, Fig. 1 is a side elevation of an automotive vehicle having a roof construction embodying the instant invention, parts thereof being broken away and shown in section for clearness of illustration.

Fig. 4 is an enlarged fragmentary, vertical sectional view taken on the line 4—4 of Fig. 1.

Figure 1:
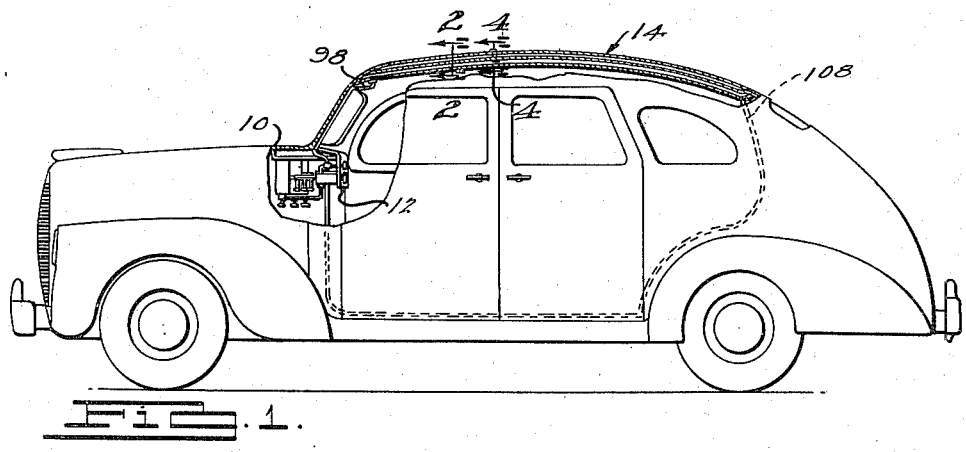
Figure 2:
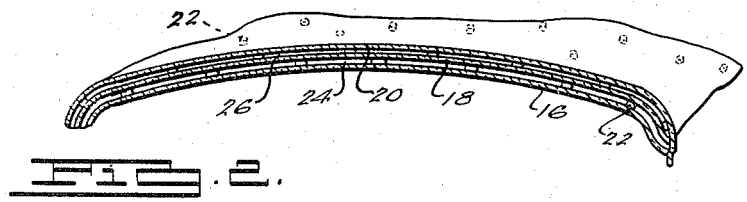
Fig. 2 is a fragmentary vertical sectional view taken on the line 2—2 of Fig. 1.

It will be understood that the present invention may be employed as a roof or side wall of any permanent or fixed, portable or movable structure whether it be a building such as a residence of the like, or a vehicle such as an automobile, bus, airplane or the like and for any roof or wall thereof, the light transmitting, light absorbing, or light reflecting qualities of which it may be desired to vary.

For the purpose of illustration, a roof construction embodying the present invention is shown and described in connection with an automotive vehicle. Heretofore, vehicle tops have usually been made of metal or a suitable waterproof fabric and, in either event, are opaque and dark in color so that they block all light rays and readily absorb and radiate heat energy. As a result, the interior of the vehicle is relatively dark at all times and, in the summertime or during periods of warm weather, becomes uncomfortably warm.

According to the instant invention, the roof or top is formed of transparent material and provided with one or more shallow chambers which preferably extend across the entire roof area. Any transparent material may be used, but certain plastics such as synthetic resins are preferred, since they are relatively strong and nonshatterable, and can be easily formed in any desired shape. The heat and light transfer properties of the roof are controlled by filling the chamber or chambers with suitable colored or opaque liquids. If more than one chamber is provided, they are arranged one above the other so that, if desired, the chambers can be filled with different liquids and the combined properties of the liquids used to control the transparency characteristics of the roof.

By properly selecting the liquids, both the light transmitting and heat absorbing power of the roof can be selectively controlled. The particular liquid or combination of liquids that will produce a certain desired result can be easily determined by those skilled in the art from the known physical properties of various liquids. In general, light colored liquids, whether transparent or opaque, reflect heat energy rather than absorb it, and dark colored liquids are good absorbers of heat energy regardless of their transparency characteristics. For example, mercury produces an opaque roof with high reflecting power and lower heat absorption. India ink or a similar fluid produces an opaque roof with low reflecting power and high heat absorption. Nonopaque blue liquids transmit most of the light spectrum but remove or block the undesirable actinic rays.

Since different liquids may be employed in the roof chambers at various times, liquids should be used that do not wet the roof material, or alternatively, the chamber walls may be treated with a suitable, solid, liquid or gaseous agent such as beeswax, petroleum wax, clear lacquer, or methyl-chloro-silane, that will make it nonabsorbent or nonadsorbent to the liquids. If solid agents are used, the surfaces of the transparent sheets which form the walls of the chambers must be treated before the roof is fabricated; however, the liquid or gaseous agents can be circulated through the system at any time to render the surfaces nonabsorbent and nonadsorbent. Obviously, the latter agents are preferred since they treat not only the roof chambers but also the pipes which serve the chambers. If nonwetting liquids or agents are not employed, some of the liquid adheres to the chamber walls and contaminates the next liquid used.

High molecular weight organic compounds, such as dithenyl-mono-ortho-xenyl-phosphate, triethyl-phosphate, tributyl-phosphate, dioctyl-sebacate, and diethyl-hexyl-phthalate have been found to be most satisfactory. Liquids of this type are nonwetting to most materials and they can be obtained in any color by the use of suitable dyes which are soluble in them.

In general, it is better to avoid liquids carrying a suspension of solid particles since the latter settle out and obstruct the roof chambers as well as the passages through which liquid is supplied to and drained from the chambers. Furthermore, the particles have a tendency to deposit on the chamber walls and thus alter the transparency characteristics of the roof material and contaminate liquids subsequently charged to the chambers.

It is to be understood that in the application of the present invention a transparent or translucent wall structure formed to provide a single film or layer of liquid may be employed or one which is formed to provide two or more such films or layers. For the purpose of illustration the roof structure shown in the drawings is illustrated as being formed to provide two such films or layers of liquid, as by such provision a more comprehensive disclosure of the present invention may be made.

For a more detailed description of the invention, reference is had to the drawing wherein is shown an automotive vehicle having a hood 10, a dashboard 12, and a top 14. The latter is constructed in accordance with the present invention and comprises vertically disposed, longitudinally and transversely curved pieces of transparent sheet material, 16, 18, and 20 which are maintained in uniformly spaced relation by a plurality of spacers 22. At their peripheries, the lower and intermediate sheets 16 and 18 flare outwardly against the inner surface of sheet 20 and are sealed thereto in any suitable manner to provide fluid-tight chambers 24 and 26. These chambers are shallow, being preferably from a 32nd to a 16th of an inch in depth, and extend across the full length and width of the vehicle top.

When liquid is charged to the upper chamber 26, air in the chamber is vented to the atmosphere through an opening 28 located at the highest point in the curved upper sheet 20. This opening is controlled by a float valve 30. The valve casing has a cylindrical lower portion 32 provided with a radial base flange 34 which is riveted or otherwise secured to the material 20 and a tapered upper portion 36 provided at its apex with an air vent 38. The latter is controlled by a conical valve 40 mounted on the upper end of a valve stem 42 which is supported in a spider bearing 44. At the lower end of stem 42 and disposed in chamber 26 is a float of cork or the like which follows the surface of the liquid in the chamber and moves the valve relative to the air vent 38. As the liquid rises in chamber 26, float 46 pushes valve 40 upwardly but does not close vent 38 until the chamber is filled with liquid. When this occurs, float 46 holds the valve firmly against the top of the casing to close the air vent 38 and prevents escape of liquid therethrough. When the valve closes, a certain amount of air is trapped in the casing above the liquid and this air cushions surging of the liquid in the roof chamber and forms a pressure relief means for expansion and contraction of the liquid.

Air is vented from the lower chamber 24 through a float valve 48 which is identical in construction and operation to the float valve 30 except that the lower portion 32 of the valve casing is formed with a downward extension 50 which projects through chamber 26 and is threaded in a collar 52. The latter is mounted in an opening 54 in the intermediate roof sheet 18 and includes a radial flange 56 which engages the sheet around opening 54 and is attached thereto by screws 58 or the like. Valve stem 42 is, of course, considerably longer in this adaption of the valve to position float 46 in the lower chamber 24. By reason of the extension 50 and collar 52, valve 48 communicates only with the lower chamber 24 and prevents intermingling of fluids in the two chambers.

Figure 3:
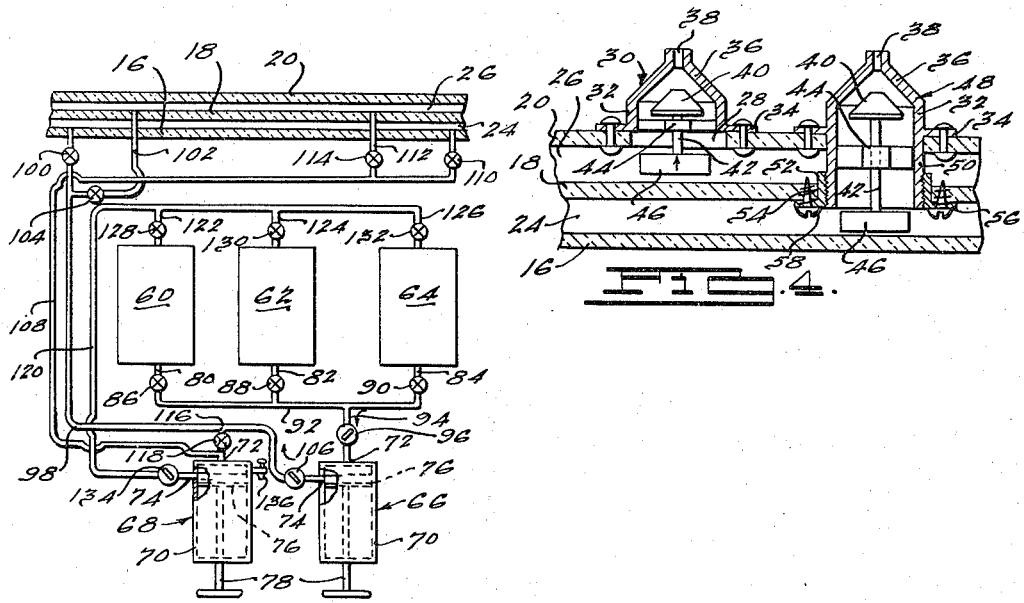
Fig. 3 is a diagrammatic view showing the manner in which fluids are circulated through shallow chambers in the roof material to control its light and heat transmitting properties.

As suggested, suitable liquids are introduced into chambers 24 and 26 to control the heat and light transfer of properties of the vehicle top. This may be done in any suitable manner; however, for the purpose of illustration, there is shown in Fig. 3 one form of apparatus for supplying either or both of the chambers with the same or different liquids and for draining the liquids therefrom. The apparatus includes three liquid containers 60, 62, and 64 which may conveniently be mounted under the hood 10 behind dashboard 12. It is to be understood that, while three containers are here shown, the invention is not limited to the use of any particular number of containers. In general, the number of containers used will depend entirely upon the manner in which the heat and light properties of the roof are to be varied. If it is desired to control only the transparency or heat transfer property of the roof, one container may be sufficient, while if both the transparency and heat transfer properties of the roof are to be controlled, two or more containers may be necessary, depending upon the particular effects or result to be obtained. For the purpose of illustration, it may be assumed that container 60 is filled with a liquid such as mercury that will render the roof opaque and is a reflector of heat energy, that container 62 is filled with a liquid such as India ink that will render the roof opaque and is an absorber of heat energy, and that container 64 is filled with a suitable blue liquid that will transmit all of the light spectrum but the actinic rays.

The various liquids in containers 60, 62 and 64 are charged to roof chambers 24 and 26 by a manually actuated pump 66 and liquids in the roof chambers are returned to their respective containers by a manually actuated pump 68. The pumps are conventional and identical in construction and operation. Each includes a cylindrical casing 70 provided with an inlet 72 in its forward end and an outlet 74 in its side wall adjacent the forward end. A piston 76, mounted for reciprocation in the casing 70, is provided with an operating handle 78 which projects through the rearward end of the casing. Both pumps are preferably mounted with the cylinder 70 disposed behind dashboard 12 and the operating handle 78 extending through the dashboard. When the containers and pumps are mounted on the vehicle in the above manner they are out of the way yet readily accessible for replacement or repair and the pumps can be easily operated by the driver or other person seated on the front seat of the vehicle.

It will be observed that the bottoms of containers 60, 62 and 64 are provided with separate outlet pipes 80, 82 and 84 controlled by manually actuated valves 86, 88 and 90, respectively. Each of the outlet pipes discharges into a manifold 92 which is connected to the inlet 72 of pump 66 by a pipe 94. A check valve 96 in the latter pipe is adapted automatically to open when piston 76 moves back in casing 70 and to close when piston 76 advances. A pipe 98 controlled by manually operated valve 100 leads from the outlet 74 of pump 66 to the lower roof chamber 24 and this pipe is provided adjacent its end with a branch pipe 102 controlled by manually operated valve 104 which communicates with the upper roof chamber 26. A check valve 106 in pipe 98 automatically opens when the piston 76 advances, and closes when the piston is retracted. Only one liquid at a time is pumped to the roof chambers to prevent contamination or intermingling of the respective liquids. Thus, valves 86, 88 and 90 are maintained normally closed and when it is desired to fill one or both of the roof chambers with liquid from one of the containers, the valve in the discharge pipe of that container only is opened so that retraction of piston 76 sucks the selected liquid into cylinder 70. When the piston moves back in the cylinder, check valve 106 closes to prevent liquid in the roof chambers from also being drawn into the pump cylinder. When the piston is pushed forwardly in cylinder 70, valve 96 closes to prevent back flow of liquid into the container, and valve 106 opens permitting the liquid to flow from the pump to the vehicle roof. It will be readily apparent that if only valve 100 is open, the liquid will flow into the lower chamber 24; if only valve 104 is open, the liquid will flow into the upper chamber 26; and if both of these valves are open, both the upper and lower chambers will receive the liquid. Thus, either or both of the roof chambers can be filled with any of the available liquids by repeated operations of pump 66. After the roof chambers are filled, the manually operated valve in the discharge pipe of the container and valves 100 and 104 are closed.

The system for returning the liquid from the roof chambers 24 and 26 is now described in detail. A liquid return pipe 108 controlled by the manually-operated valve 110 leads from the lower chamber 24 to the inlet 72 of pump 68. Adjacent its outer or upper end, pipe 108 is provided with a branch pipe 112 through which liquid drains from the upper roof chamber 26. Branch pipe 112 is controlled by a manually-operated valve 114. Adjacent its inner or lower end, pipe 108 is connected by another branch pipe 116 to pipe 98 intermediate the manually-operated valves 100 and 104 and check valve 106. Branch pipe 116 is controlled by a manually-operated valve 118. The outlet 74 of pump 68 is connected to containers 60, 62 and 64 by a pipe 120 and a plurality of inlet pipes 122, 124 and 126. The inlet pipes are controlled by manually-operated valves 128, 130 and 132, and pipe 120 is controlled by a check valve 134 which automatically closes when piston 76 is retracted and opens when the piston advances. Also attached to the inlet end of casing 70 is a manually-operated pet cock 136 of the type equipped with a check valve which, when the manual control is open, is automatically opened by retraction of piston 76 to admit air to the casing and automatically closed by advancement of the piston.

If both of the roof chambers are filled with the same liquid and it is desired to empty them it is merely necessary to open valves 100, 104, 110 and 114 as well as the valve in the inlet pipe of the container to which the liquid is to be returned and to repeatedly actuate pump 68. At first the pump is actuated with pet cock 136 closed so that the pump draws liquid from the roof chambers through pipes 98, 102, 108 and 112 and discharges it to the container through pipe 120. As shown in Fig. 1, and diagrammatically illustrated in Fig. 3, pipe 98 and its branch 102 communicate with the forward ends of the roof chambers 24 and 26 while pipe 108 and its branch 112 communicate with the rearward ends of these chambers. This arrangement is necessary in view of the transverse and longitudinal curvature in the roof. Pump 68 also sucks liquid from pump 66 when valve 118 is open and pumps it back to the container when valve 118 is closed. Thus, any of the liquid which remains in the manifold 92 or pipe 94 is returned to the container as well as liquid from the roof chambers 24 and 26. When all liquid has been drained from chambers 24 and 26 and from pump 66, the manual control of pet cock 136 is opened so that pump 68 pumps air under pressure into pipe 120 to force residual liquid therein into the container. The system is then cleared so that a different liquid can be charged to the roof chambers without danger of contamination.

It will be readily appreciated that, if the liquids in tanks 60, 62 and 64 are to be used separately, one roof chamber is sufficient. However, it may be expedient under some circumstances to fill the lower chamber 24 with India ink from container 62 in order to obtain an opaque roof that is a good absorber of heat energy. The liquid is charged to the chamber through pipe 98 and, when the chamber is filled, valve 100 is closed. Pump 68 can then be manipulated to return liquid in the pipes to container 62 thus clearing the system. An opaque roof that is a poor absorber of heat energy can then be obtained without removing the liquid in chamber 24 by merely pumping mercury from container 60 into the upper chamber 26.

The pigment or other constituents in India ink sometimes tend to settle out and deposit on the walls of the chambers and piping. The same effect can be obtained by providing containers of red and green liquids which may conveniently be any of those hereinabove mentioned suitably colored by soluble dyes. When one of the roof chambers is filled with the green liquid and the other roof chamber with the red liquid, the combined effect of the two liquids is to block the entire light spectrum and produce an opaque roof. This method of controlling the light transfer properties of the roof has the further advantage that different effects and varying degrees of transparency can be obtained by using the red and green liquids separately.

While red and green liquids have been specifically mentioned by way of example, it is to be understood that the invention contemplates the use of liquids of any color alone or in different combinations to produce any particular desired effect. It is also to be understood that while two roof chambers are here shown, any number can be used. Under some circumstances it may be desirable to provide three or even more chambers. Each of the chambers may be made to cover the entire roof area or only a portion thereof or some of the chambers may be made to cover the entire roof area and other chambers to cover only a portion of the entire area.

It is to be understood that the form of the invention herewith shown and described is to be taken as a preferred example of the same and that various changes in the size, shape and arrangement of parts may be resorted to without departing from the spirit of the invention or the scope of the appended claims.

What is claimed is:

1. A roof construction comprising spaced upper and lower members of transparent sheet material sealed at their edges to provide a closed chamber therebetween, means for filling said chamber with a liquid, automatic means communicating with the atmosphere and operable by liquid in the chamber to trap a body of air in the chamber above said liquid, whereby said air cushions surging of the liquid in said chamber, and means for draining the liquid from the chamber.

2. A roof construction comprising a hollow, transparent member; liquid in the internal chamber of said member capable of altering the light or heat transfer properties of the member; and valve means in one wall of the chamber operable by said liquid to trap a body of air in the chamber, whereby said air cushions surging of said liquid in the chamber.

3. A roof construction comprising a hollow, transparent member; means for introducing a plurality of different fluids into the internal chamber of the member; means forming a film on the walls of said chamber, said film rendering said walls substantially nonabsorbent and nonadsorbent to fluids introduced into said chamber; and means for drawing the fluids from said chamber.

4. A roof construction comprising a relatively thin member capable of transmitting both heat and light energy and provided with a shallow internal chamber; a liquid capable of altering the light or heat transfer properties of said member; and means for circulating said liquid through the chamber.

5. A roof construction comprising a relatively thin, substantially transparent member provided with separate chambers, said chambers being essentially shallow and disposed one above the other; and means for introducing different liquids into each of said chambers.

6. A roof construction comprising a substantially transparent sheet material provided with a plurality of vertically spaced shallow chambers; means for circulating different liquids separately through said chambers; and means forming films on the walls of said chambers for preventing the liquids from wetting said walls.

7. A roof construction comprising a substantially transparent sheet material provided with separate upper and lower chambers, said chambers being shallow and substantially co-extensive, and means for introducing different liquids into each of said upper and lower chambers, each of said liquids having a predetermined effect on the heat or light transfer properties of the material and collectively having a different effect upon said properties.

8. A roof construction comprising a substantially transparent sheet material provided with separate upper and lower chambers, a liquid capable of altering the heat or light transfer properties of the sheet material, means for introducing said liquid into one of said chambers at a point below the top of the same, means for draining the liquid from said chamber, a second liquid capable of altering the effect of the first liquid on the heat or light transfer properties of the material, means for introducing the second liquid into the other chamber at a point below the top of the same, means for draining the second liquid from said other chamber, and a float valve at the top of each chamber, said valves venting their respective chambers to the atmosphere and operable by liquids therein to trap air above said liquids, whereby the trapped air in said chambers cushions surging of the liquid in the chambers.

9. In a device of the character described, transparent sheet material provided with superposed, relatively shallow chambers; a plurality of different liquids capable of altering the light or heat-transfer properties of said material; separate containers for said liquids; means for selectively introducing each of said liquids into the chambers and for drawing the liquids from the chambers back to their respective containers, said means including conduits between said containers and said chambers, means for forcing liquid under pressure from said containers to said chambers, and valve means in said conduits for controlling the flow of liquid therethrough, whereby any of said liquids can be selectively introduced into either of said chambers independently of the other liquids; and means forming films on the walls of said chambers and said conduits to prevent said liquids from wetting the same.

10. In a device of the character described, transparent sheet material provided with superposed relatively shallow chambers; a plurality of different liquids adapted to be introduced into said chambers and each having a different effect on the light or heat transfer properties of said material; separate containers for each of said liquids; means for separately introducing each of said liquids into said chambers and for draining each of said liquids from the chambers back to its respective container, said means including a pump for forcing liquid to the chambers; a separate pump for forcing liquid from the chambers, conduit means establishing communication between said containers and the fluid inlets of said pumps, conduit means establishing communication between the discharge ports of said pumps and the chambers at a point below the tops of the latter, and valve means in said conduits for controlling the flow of liquid therethrough, whereby any of said liquids can be selectively introduced into said chambers independently of the other liquids; and a float valve in the wall and at the top of each chamber, each of said valves normally open to vent its respective chamber to the atmosphere but adapted to be closed by liquid in said chamber to trap a body of air above the liquid, whereby said air cushions surging of the liquids in said chambers.

11. In a device of the character described, transparent sheet material provided with superposed relatively shallow chambers; a plurality of different liquids adapted to be introduced into said chambers and each having a different effect on the light or heat transfer properties of said material; separate containers for each of said liquids; means for separately introducing each of said liquids into said chambers and for draining each of said liquids from the chambers back to its respective container, said means including a pump for forcing liquid to the chambers; a separate pump for forcing liquid from the chambers, conduit means establishing communication between said containers and the fluid inlets of said pumps, conduit means establishing communication between the discharge ports of said pumps and the chambers at a point below the tops of the latter, and valve means in said conduits for controlling the flow of liquid therethrough, whereby any of said liquids can be selectively introduced into said chambers independently of the other liquids; means forming films on the walls of said chambers and said conduits for preventing said liquids from wetting the same; and a float valve in the wall and at the top of each chamber, said valves normally open to vent the chambers to the atmosphere and each adapted to be closed by liquid in its respective chamber to trap a body of air above the liquid, whereby said air cushions surging of the liquids in said chambers.

GEORGE V. CANDLER, Jr.

REFERENCES CITED

The following references are of record in the file of this patent:

UNITED STATES PATENTS

| Number | Name | Date |
|---|---|---|
| 2,062,747 | Gelstharp | Dec. 1, 1936 |
| 2,373,214 | Wolkenhauer | Apr. 10, 1945 |
| 2,378,591 | Solis | June 19, 1945 |

FOREIGN PATENTS

| Number | Country | Date |
|---|---|---|
| 613,587 | France | Aug. 27, 1926 |
| 698,262 | Germany | Nov. 6, 1940 |